Figure 1:
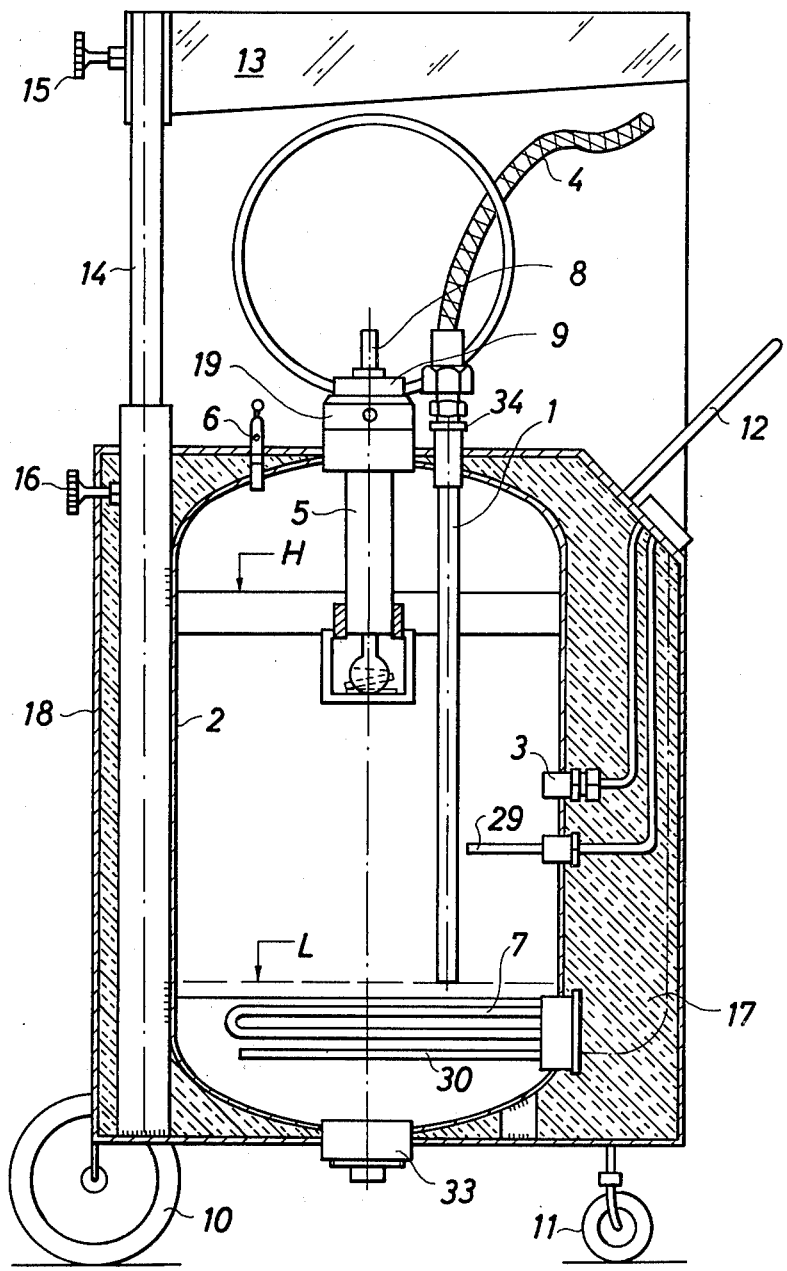

United States Patent [19]

Nielsen

[11] 4,222,521

[45] Sep. 16, 1980

[54] APPARATUS FOR CLEANING OBJECTS BY MEANS OF A JET OF LIQUID

[75] Inventor: Gert Nielsen, Cratloe, Northern Ireland

[73] Assignee: Gerni A/S, Randers, Denmark

[21] Appl. No.: 1,085

[22] Filed: Jan. 5, 1979

[30] Foreign Application Priority Data

Mar. 6, 1978 [DK] Denmark ............................ 1001/78
Apr. 3, 1978 [DK] Denmark ............................ 1470/78
Jul. 26, 1978 [DE] Fed. Rep. of Germany ... 7822360[U]

[51] Int. Cl.² .................................................. B05B 1/24
[52] U.S. Cl. ................................ 239/135; 137/588; 137/592; 239/373
[58] Field of Search ................ 239/130, 135, 373; 137/588, 592; 220/366

[56] References Cited

U.S. PATENT DOCUMENTS

| 272,684 | 2/1883 | Hall | 137/592 X |
|---|---|---|---|
| 2,904,967 | 9/1959 | Henderson | 137/590 X |
| 2,923,480 | 2/1960 | Christian | 239/135 X |
| 3,106,937 | 10/1963 | Sands | 239/572 X |
| 3,133,306 | 5/1964 | Pitts | 15/547 |
| 3,226,030 | 12/1965 | Rossi | 239/135 |
| 3,260,463 | 7/1966 | Giouansanti | 239/72 |
| 3,282,510 | 11/1966 | Van Schwartz | 239/373 |
| 3,302,664 | 2/1967 | Plamann | 220/366 X |
| 3,964,508 | 6/1976 | Miller | 220/366 X |
| 3,972,089 | 8/1976 | Parks | 15/345 |

FOREIGN PATENT DOCUMENTS

856559 9/1952 Fed. Rep. of Germany .
859265 10/1952 Fed. Rep. of Germany .
1084839 1/1955 France .

*Primary Examiner*—Richard A. Schacher
*Attorney, Agent, or Firm*—Millen & White

[57] ABSTRACT

An apparatus for cleaning objects by means of a jet of liquid and comprising an upright pressure tank with a liquid filling pipe extending downwards therein for filling the tank to a predetermined level. The air cushion above the liquid surface is pressurized through valve means at the top of the tank, and the liquid can be forced through a connecting branch to a hose provided with a spray gun. This connecting branch opens on to the tank at a level above the heating means in the liquid. Pressure relief means are provided so that the upper space of the tank is ventilated to the atmosphere before a closing member at the top of the filling pipe is fully opened, so that hot liquid and possibly the closure member itself cannot be ejected by the pressurized tank. Furthermore a safety device arranged between the pressure tank and the spray gun hose ensures that only a limited amount of liquid will flow through if the liquid pressure in the hose falls owing to rupture of the hose wall.

7 Claims, 3 Drawing Figures

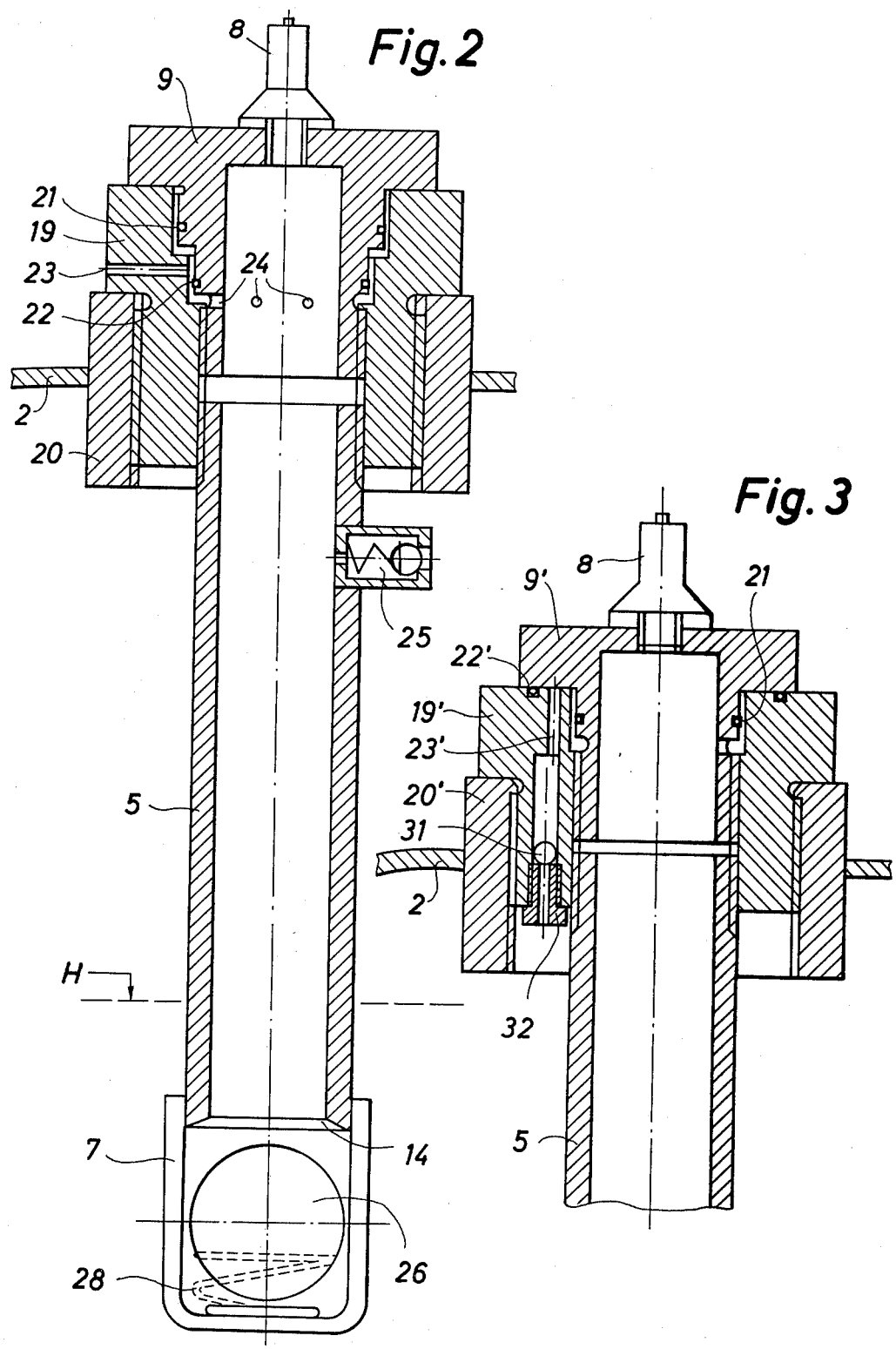

APPARATUS FOR CLEANING OBJECTS BY MEANS OF A JET OF LIQUID

BACKGROUND OF THE INVENTION

The present invention relates to an apparatus for cleaning objects by means of a jet of liquid and comprising a housing with a connecting branch for a hose, the opposite end of which is connected to a spray gun. This apparatus is especially, but not exclusively, made to clean the brakes of cars. When cleaning the brakes of cars it is far less injurious to health to clean with a jet of liquid than to clean, as previously, with a blast of air, since loose asbestos fibers and other impurities from the brake blocks are blown out with the air. However, the cleaning with a pressurized jet of liquid is usually considered more difficult due to somewhat more complicated wiring, as well as more hazardous especially when hot pressurized water is used, whereby misapplication or damage to pipes or hoses may cause scalding or explosion accidents.

The object of the invention is to provide an apparatus of the above type which is inexpensive, simple, and easy to move to the site, and which futhermore is particularly adapted so as to be easy and safe to handle also by unskilled persons without risking accidents owing to careless use or damage to the hose.

SUMMARY OF THE INVENTION

The apparatus according to the invention is characterized in that the housing is a pressure tank comprising valve means for introduction of pressurized air into its upper portion, a liquid filling pipe with a shutoff device, which extends a short distance down into the tank from the upper end plate and which at its upper protruding end comprises a closing member for closing and opening of the liquid filling pipe, and pressure relief means for ventilating the upper portion of the tank to the atmosphere before the closing member when fully opened permits free access to the atmosphere, and that the connecting branch of the spray gun hose opens on to the tank above a level on which heating means for heating the liquid are situated within the tank.

DETAILED DISCUSSION

This auxiliary apparatus is far more simply constructed than the high pressure hot water cleaners used for other purposes and can be used without difficulty at any workshop using pressurized air. The tank is simply filled with water to which a cleaning preparation or other cleaning liquid has optionally been added, to the maximum level determined by the length of the filling pipe extending downwards in the tank. The liquid is quickly heated, e.g. to about 80° C., by means of the heating means always immersed in the liquid, thus eliminating the risk of damage caused by the tank boiling dry. Subsequently, pressurized air is introduced into the space above the surface of the liquid until the air pressure reaches a volume of e.g. 6 bar. The apparatus is now ready for use and can be used for cleaning e.g. a brake block, the pressurized air pressing out the cleaning liquid when the spray gun is opened until the liquid level in the pressure tank has reached the level of the connecting branch of the hose and the air pressure in the tank has dropped correspondingly. A basin is placed under the brake or another object to be cleaned, the hot cleaning liquid washes the brake, and the mixture of water, dirt, and asbestos fibers is collected in the basin. Since the cleaning is performed with liquid, the asbestos fibers are bound and prevented from spreading into and polluting the air. The apparatus can be quickly recharged when the liquid and the pressurized air are expended. An important advantage of the apparatus is that the pressure relief means prevent scalding caused by hot outflowing water or injury resulting from discharge of the closing member from the tank when under pressure. In this manner accidents are avoided, even though the closing member on the liquid filling pipe is opened while the pressure tank is being filled with hot highly pressurized water, which for instance may be the case when the user of the apparatus remembers that he has forgotten to add cleaning liquid to the water.

According to the invention, the closing member of the filling pipe is a threaded screw cap comprising a pipe extending through the end plate of the cap, said pipe in its upper end comprising a non-return valve adapted to be connected to a pressurized air-pipe, and whereby the filling pipe and the screw cap comprise mutually cooperating valve means, which, by unscrewing the screw cap slightly from its closed position, open an air flow passage between the pressure tank and the atmosphere in good time before the screw cap is unscrewed completely off the filling pipe. The pressure within the tank can be considerably relieved while the screw cap is still secured by the thread, and the outflowing air warns the user of the risk when unscrewing the screw cap too quickly.

The outflow of pressurized air from the space above the surface of the water in the pressure tank preferably takes place through a pressure relief channel in the stub, on which the cap is mounted, since the initial unscrewing of the cap causes a sealing ring such as a joint torique to cease to block off the flow through the pressure relief channel, which is in communication with the air-filled space in the tank preferably via a non-return valve.

In order to eliminate the risk that liquid is pressed upwards, in spite of the automatic ventilation, through the filling pipe when the screw cap is quickly unscrewed and while the tank is under pressure, the lower end of the filling pipe is provided with a non-return valve permitting inflow but preventing outflow of water from the tank.

Furthermore, in order to avoid accidents when using the apparatus, a safety device is, according to a preferred embodiment of the invention, coupled in the connection between the pressure tank and the resilient hose, said safety device being adapted in such manner that the amount of the medium flowing through the device per time unit cannot exceed a predetermined value. It is generally known that the bursting of the hose feeding water to a spray gun often causes scalding when using hot, highly pressurized water, and that the bursting of the hose may in general cause serious damage even though the medium sprayed out is not heated. In the event that the hose is torn, this safety device ensures that liquid, especially hot, highly pressurized water, is not suddenly discharged in all directions with resultant risk of scalding the user and damaging the surroundings.

According to the invention the safety device may be formed with a passage having greatly reduced dimensions, e.g. with an opening having a diameter as small as about 2 mm, or it may be a valve, the valve unit of which when moving towards its closed position is kept slightly opened. Furthermore, the safety device may be a so-called water flow restrictor, in which the free passage area is reduced relative to the drop of pressure in the device, so that the volume of liquid passing per time unit remains substantially constant.

THE DRAWINGS

The invention will be described below with reference to the accompanying drawing, in which FIG. 1 illustrates an embodiment of the apparatus according to the invention, and FIGS. 2 and 3 illustrate two different embodiments of a screw cap provided with pressure relief means for closing the liquid filling pipe.

The apparatus illustrated in FIG. 1 comprises a vertical, cylindrical pressure tank 2 of steel having arched end plates and being surrounded by a heat insulating material 17 and an exterior jacket 18.

A connecting branch 1 is situated on the pressure tank, said branch being connected to a spray gun having a wash nozzle (not shown) via a hose 4 situated outside the tank. The length of the branch 1 is adapted in such manner that water can only be emptied through the pipe until the water surface in the tank 2 has dropped to a minimum liquid level L located above a heating means 7 for heating the water in the tank.

A filling pipe 5 extends downwards through the center of the upper end plate of the tank and into the interior of the tank, whereby a space having a reasonable volume for driving air for pressing out the water, is always provided over a maximum liquid level H. A threaded screw cap 9, 9' is screwed into a corresponding thread at the top of the pipe 5. The end plate of the screw cap is provided with a simple air valve 8 for filling the tank with driving air, e.g. of the kind used for pumping car tires.

When the screw cap 9 has been removed, liquid, usually water, is filled in the tank 2 until the maximum level H in the tank has been reached. Subsequently, the screw cap 9 is screwed on, and the valve 8 is connected to a pressurized air hose, whereafter air is introduced through the filling pipe 5 until the pressure above the liquid in the tank has reached e.g. 6 bar. The pressure is read by means of a manometer connected to a pressure gauge 3, and a safety valve 6 is adapted to open in case the pressure exceeds the predetermined value. When the pressurized air hose has been removed, the apparatus is ready for use and can be moved to the site on road wheels 10 and caster wheels 11, e.g. to a workshop for cleaning brakes and clutches.

The apparatus, which is controlled by a handle 12, is provided with a basin 13 placed under the brake or another object to be cleaned. When the spray gun is opened the pressurized air forces out the heated water, optionally with an admixture of cleaning liquid and washes the brake. The mixture of water, dirt, and asbestos fibers is collected in the basin 13. This basin is mounted on a pipe 14 and is adjustable in height by means of thumbscrews 15 and 16.

The reference numeral 33 stands for a dirt-outflow stub. 29 refers to a thermometer coil and 30 to a temperature meter permitting regulation of the water temperature from e.g. 20 to 80° C. As an additional security, the apparatus is provided with a priming thermostat interrupting the current to the heating means when the temperature exceeds a predetermined value, e.g. 87° C.

According to the invention the cap of the filling pipe is adapted in such manner that automatic pressure relief occurs by ventilating the space above the liquid level in the tank 2 upon initial opening of the closure.

FIG. 2 illustrates a preferred embodiment, wherein the filling pipe 5 is closed by a screw cap 9 screwed into a bush 19. This bush is situated in a stub 20 secured to the top wall of the tank. A joint torique 21 forms a seal between the screw cap and the bush 19, and a second joint torique forms a sealing ring closing a transverse pressure relief channel 23 in the wall in the bush 19 when the cap is completely screwed in. Directly under the sealing ring 22, a plurality of apertures 24 is provided in the wall of the screw cap, and initial unscrewing of the screw cap 9 will cause the sealing ring 22 to pass above the opening of the pressure relief channel 23, so that air from the filling pipe 5 may flow out into the atmosphere. The air at the top portion of the tank 2 flows through a ventilating non-return valve 25 in such a manner that pressure may be ventilated to the atmosphere.

A non-return valve 26 at the bottom end of the filling pipe ensures that liquid is not pressed upwards in the filling pipe, even though the screw cap 9 is unscrewed very quickly while the tank is under pressure. The bottom end of the filling pipe is turned in such a manner that it forms a seat for the ball-shaped valve body. This valve body is prepared of a very light material or supported by a spring 28 bearing against a wire basket 27 wherein the non-return valve is situated. This ensures that the ball is always closed towards the pipe when the screw cap is unscrewed from the tank under pressure, regardless of whether the liquid level is above or below the non-return valve. When filling with fresh liquid the non-return valve 26 is easily opened by the down flowing liquid. The non-return valve ensures that the tank cannot be filled to more than the maximum level H since the spring 28 does not permit opening of the valve until a slight superatmospheric pressure, e.g. 1.1 bar, has been reached.

FIG. 3 illustrates a screw cap 9' comprising somewhat simpler pressure relief means. In this example the sealing ring 22' forms a seal, which closes a pressure relief channel 23' extending parallel to the filling pipe 5, when the screw cap is completely screwed on. At its lower end the pressure relief channel 23' extends into a space containing a ball 31, which together with a valve seat on a nipple 32 form a ventilating non-return valve. When the underside of the screw cap upon initial unscrewing rises from the sealing ring 22' the air in the pressure tank 2 can flow through the channel 23', the ball 31 being lifted by the out-flowing air. When fresh liquid is added, the ball 31 ensures that liquid cannot rise above the maximum level, the weight of the ball being capable of maintaining a pressure of 1.1 bar. In this case too, a non-return valve 26 can at the lower end of the filling pipe 5 prevent water from being forced out through the pipe when the screw cap is unscrewed too quickly.

A safety device 34 is mounted on the end of the connecting branch 1 projecting from the tank. The discharge end of this safety device is connected to the hose 4 feeding the spray gun. Should bursting of the hose 4 occur, the safety device 34 will function and prevent the hot water in the pressure tank 2 from being discharged with great power through the breaking point in all directions, since the through-flowing amount of water cannot exceed a predetermined value owing to said volume-restricting device. The passage of the device may have a great reduction in dimension, e.g. having a flow area with a diameter as little as 2 mm, or a valve locked in a slightly open position, a spring-loaded valve or a volume restrictor, wherein the free flow area is reduced with the drop in pressure through the device, thus keeping the flow substantially constant under all circumstances.

I claim:

1. An apparatus for cleaning objects by means of a jet of liquid, and comprising a housing in the form of a pressure tank with a connecting branch for attachment to a hose with the opposite end of the hose adapted for connection to a spray gun and opening into the tank above a level receiving heating means for the liquid within the tank; a liquid filling pipe extending a short distance into the upper portion of the tank from the top closing wall portion thereof and terminating in a shutoff device at the inner end thereof; and means mounting the filling pipe to the top closing wall portion of the tank and including a stub pipe around the filling pipe and mounted to the top closing wall portion of the tank; a threaded screw cap in the stub pipe and having a joint seal therewith and closing the outer end of the filling pipe and including a pipe extension therethrough provided with a non-return valve for connection to a source of air under pressure for introduction of pressurized air into the upper portion of the tank through the shutoff device; said screw cap and stud pipe providing mutually cooperating valve means by means providing a pressure relief channel in the pipe stub and a sealing ring positioned between the pipe stub and screw cap such that the pressure relief channel is closed by the sealing ring when the screw cap is in completely screwed on seated position and is open to permit pressure relief passage through said channel when the screw cap is only slightly unscrewed from seated position; and an air outlet valve located within the upper portion of the tank and operable when subjected to a little superatmospheric pressure to open a connection between the upper portion of the tank and the pressure relief channel.

2. An apparatus as claimed in claim 1, wherein the pressure relief channel extends transversely through the wall of the stub pipe; wherein the wall of the screw cap is provided with a plurality of transverse apertures therethrough and the sealing ring surrounds the wall of the screw cap thereabove, and wherein the air outlet valve is located directly below the stub pipe and opening toward the filling pipe.

3. An apparatus as claimed in claim 1, wherein the pressure relief channel extends through the stub pipe parallel to the filling pipe and the sealing ring is embedded in the end of the stub pipe around the opening therethrough; wherein the screw cap is provided with an outward radial flange disposed over the sealing ring for cooperation therewith in controlling the relief channel; and wherein the air outlet valve is disposed in the bottom of the relief channel.

4. An apparatus as claimed in claim 1, wherein a safety device is coupled in the passage between the branch connection and the hose and is operable to prevent the amount of liquid medium flowing through the device per unit of time from exceeding a predetermined value.

5. An apparatus as claimed in claim 4, wherein the safety device comprises means with a highly reduced opening area for restricting the rate of fluid medium flow therethrough.

6. An apparatus as claimed in claim 5, wherein the safety device comprises a water flow restrictor in which the free opening area is reduced such that when a drop in pressure through the device occurs, the volume of liquid passing per unit of time therethrough remains substantially constant.

7. An apparatus as claimed in 6, wherein the safety device comprises a spring-loaded valve in which the fluid passage past the valve cannot be completely closed off.

* * * * *